United States Patent

Basuthakur et al.

[11] Patent Number: 5,906,339
[45] Date of Patent: May 25, 1999

[54] MULTIPLE AXIS SOLAR SAILING

[75] Inventors: Sibnath Basuthakur, Phoenix; Rodrigo Ibanez-Meier, Chandler; Bob Dennis Stratman, Tempe, all of Ariz.

[73] Assignee: Motorola, Inc., Schaumburg, Ill.

[21] Appl. No.: 08/743,767

[22] Filed: Nov. 7, 1996

[51] Int. Cl.⁶ .............................. B64G 1/32; B64G 1/38; B64G 1/44
[52] U.S. Cl. ........................ 244/166; 244/170; 244/173
[58] Field of Search .................... 244/166, 168, 244/170, 171, 173

[56] References Cited

U.S. PATENT DOCUMENTS

| Re. 29,177 | 4/1977 | Michaelis | 244/166 |
|---|---|---|---|
| 4,325,124 | 4/1982 | Renner | 364/459 |
| 4,591,116 | 5/1986 | Guenther et al. | 244/168 |
| 4,732,354 | 3/1988 | Lievre | 244/170 |
| 4,747,567 | 5/1988 | Johnson et al. | 244/173 |
| 4,759,517 | 7/1988 | Clark | 244/168 |
| 4,949,922 | 8/1990 | Rosen | 244/168 |
| 5,133,518 | 7/1992 | Flament | 244/173 |
| 5,149,022 | 9/1992 | Flament | 244/168 |
| 5,305,971 | 4/1994 | Decanini | 244/168 |
| 5,310,144 | 5/1994 | Salvatore et al. | 244/168 |
| 5,413,293 | 5/1995 | Gomberg et al. | 244/166 |
| 5,540,405 | 7/1996 | Bender et al. | 244/166 |
| 5,563,794 | 10/1996 | Cosner et al. | 244/164 |

FOREIGN PATENT DOCUMENTS

| 0372434 | 12/1989 | European Pat. Off. | B64G 1/36 |
|---|---|---|---|
| 0578176 | 7/1993 | European Pat. Off. | B64G 1/24 |
| 0603869 | 12/1993 | European Pat. Off. | B64G 1/32 |
| 9209479 | 6/1992 | WIPO | B64G 1/24 |
| 9219498 | 11/1992 | WIPO | B64G 1/24 |

Primary Examiner—Lissi Mojica
Attorney, Agent, or Firm—Dana B. LeMoine

[57] ABSTRACT

In a satellite (20), two-axis solar panel drives (56, 58) allow two degrees of rotational freedom of movement for solar panels (22, 24). Regulation of electrical current loops (46, 48) within the solar panels (22, 24) generates a magnetic field. When the solar panels (22, 24) are tilted about an overturning axis (28), the magnetic field provides a component of a control torque about a pitch axis (30). An on-board processor (52) commands the panel drives (56, 58) and a magnetic torque actuator (60) to instantaneously and simultaneously damp disturbance torques about a windmill axis (26), an overturning axis (28), and a pitch axis (30). The processor (52) allows disturbance torque to be corrected continuously rather than periodically over the course of an orbit. Counter-disturbance torques (90) are applied (88) in synchronism with a satellite nutation frequency (76) but out of phase with the nutation so that nutation is damped.

20 Claims, 4 Drawing Sheets

MULTIPLE AXIS SOLAR SAILING

TECHNICAL FIELD OF THE INVENTION

The present invention relates generally to the field of space vehicle control systems, and specifically to the field of satellite attitude control.

BACKGROUND OF THE INVENTION

Many factors, including solar wind, the earth's magnetic field, and gravity, contribute to attitude error of satellites in earth orbit. These factors induce disturbance torques about satellite axes. The disturbance torques are often described using terms related to windmill, overturning, and pitch axes. The windmill and overturning axes lie primarily in the azimuth (roll-yaw) plane and are perpendicular to each other. The pitch axis is perpendicular to both the windmill and overturning axes. When a satellite experiences such disturbance torques, momentum wheels become loaded and the satellite may experience rotational motions about its various axes.

Attitude error caused by disturbance torques affects the level of service that a satellite can provide. For example, the attitude of a communication satellite should be precisely maintained in order to align a communication antenna with an antenna target. When attitude error is not corrected, the satellite consumes excessive power in order to transmit communications at a higher power level to compensate for antenna misalignment. In addition, attitude error causes "cosine" power loss, especially during the solstice periods of the year. Cosine power loss results from incorrectly aligning the solar panels with respect to the sun. To the extent that solar panels are not optimally aligned with the-sun, the solar panels generate less electrical power than they might otherwise Conventional methods of damping disturbance torques involve the utilization of tanks and momentum wheels located in the satellite body to slowly absorb the disturbance. However, the disturbance loading must eventually be unloaded or the satellite attitude will suffer. When the disturbances are unloaded, attitude errors can occur.

One-axis solar sailing or tacking is often utilized to counter disturbance torques. Conventional solar tacking techniques involve extensive activations of solar panel rotation stepper motors to pivot the solar panels about the pitch axis. However, this type of solar tacking generates undesirable windmill torques which occasionally pass through a zero torque. As the windmill torque passes through zero, attitude transients would result if solar tacking were employed to correct unwanted disturbance motions. To prevent these attitude transients, conventional techniques excessively accumulate attitude error until the attitude error can be corrected without encountering a significant duration of zero windmill torque. In general, attempting to counteract a disturbance torque in only one dimension aggravates disturbance problems in the remaining two dimensions.

In addition, a conventional use of solar tacking to address attitude disturbance control involves moving solar panels up to 15 degrees or more as quickly as possible, and holding the panels in position for roughly a six-hour period before returning the panels to their prior orientation. This allows build-up of secular momentum and significant variation of cyclical momentum. Moreover, single-axis solar tacking techniques excessively prohibit solar panels from squarely facing the Sun. This results in excessive cosine power loss, especially during the solstice periods of the year.

Disturbances due to solar, magnetic, or gravitational influences or by counter-disturbance satellite motions cause another form of attitude error called nutation, primarily about the pitch axis. Nutation leads to inefficient satellite power management. Thus, a need exists to cancel out nutation to better control satellite attitude.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

In the preferred embodiments, two-axis solar panel drives (beta drives) and magnetic torquing circuits located on solar panels are used together to concurrently and continuously damp disturbance torques about the windmill, overturning, and pitch axes. The generation of damping counter-disturbance torques allows built-up secular momentum to be dumped and allows for continuous, rather than periodic, compensation for undesirable disturbance torques over the course of an orbit. As a result, desired satellite attitudes can be precisely maintained and overall satellite power can be managed efficiently.

Figure 1:
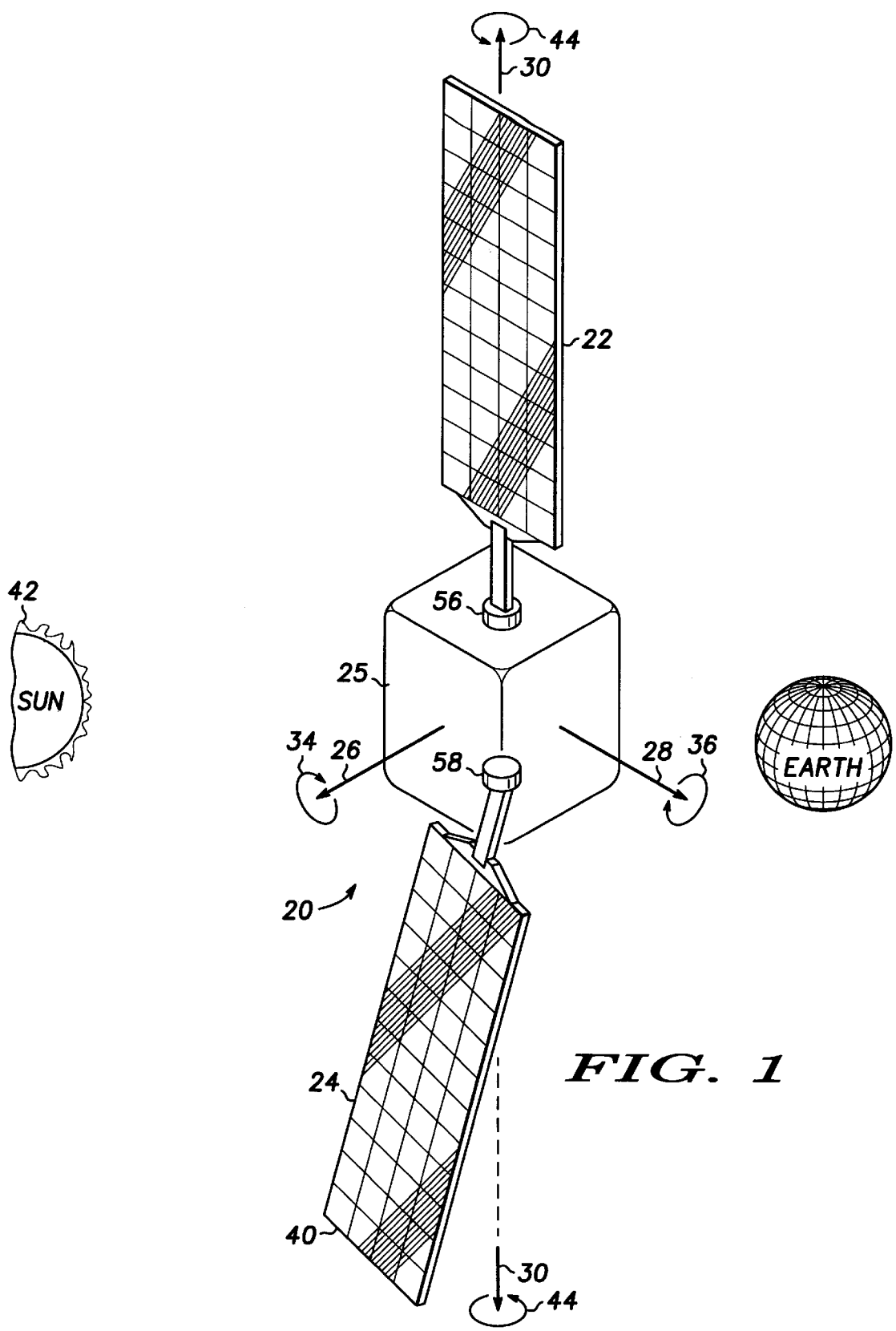
FIG. 1 shows a satellite having two solar panels and angles traversed by moving the solar panels about the overturning and pitch axes in accordance with a preferred embodiment of the present invention.

FIG. 1 shows satellite 20 having two solar panels 22, 24 and angles traversed by moving solar panels 22, 24 about the overturning and pitch axes 28, 30 in accordance with a preferred embodiment of the present invention. Satellite 20 has a north solar panel 22 and a south solar panel 24 rotatably coupled to a satellite body 25. FIG. 1 indicates directions of permitted movements by solar panels 22 and 24 about an overturning axis 28 and a pitch axis 30. A windmill axis 26 and overturning axis 28 lie primarily in the azimuth (roll-yaw) plane. Windmill axis 26 and overturning axis 28 are perpendicular to each other. Pitch axis 30 is perpendicular to both windmill axis 26 and overturning axis 28. Windmill axis 26 extends from solar panels 22 and 24 generally toward the sun 42. An arrow 34 indicates potential rotational movement about windmill axis 26.

Overturning axis 28 extends roughly in the direction of the width of solar panels 22 and 24 when solar panels 22 and 24 are not pivoted about pitch axis 30 due to solar tacking. Tilting of a distal end 40 of solar panel 24 about overturning axis 28 is indicated by an arrow 36. Thus, movement about overturning axis 28 tilts solar panel 24 toward or away from the sun and at an oblique angle to satellite body 25. FIG. 1 depicts south panel 24 tilted at an oblique angle while north panel 22 is normal to a north side of satellite body 25 for the purpose of example. In the preferred embodiments, either panel 22 or 24 may be tilted at an oblique angle or not tilted as needed to provide a desirable counter-disturbance torque.

Pitch axis 30 extends roughly along the elongated surface of solar panels 22 and 24 when solar panels 22 and 24 are not tilted about overturning axis 28. In other words, solar panels 22 and 24 are deployed substantially along pitch axis 30, even though panels 22 and 24 may tilt away from pitch axis 30 as discussed above. Pivotal movement of solar panels 22 and 24 about pitch axis 30 is indicated by an arrow 44, Thus, rotational movement about pitch axis 30 pivots solar panels 22 and 24 in a conventional one-axis solar tacking maneuver. The tilting and pivoting of solar panels 22 and 24 is accomplished by two-axis (beta) drives 56 and 58 in a manner known to those skilled in the art.

Figure 2:
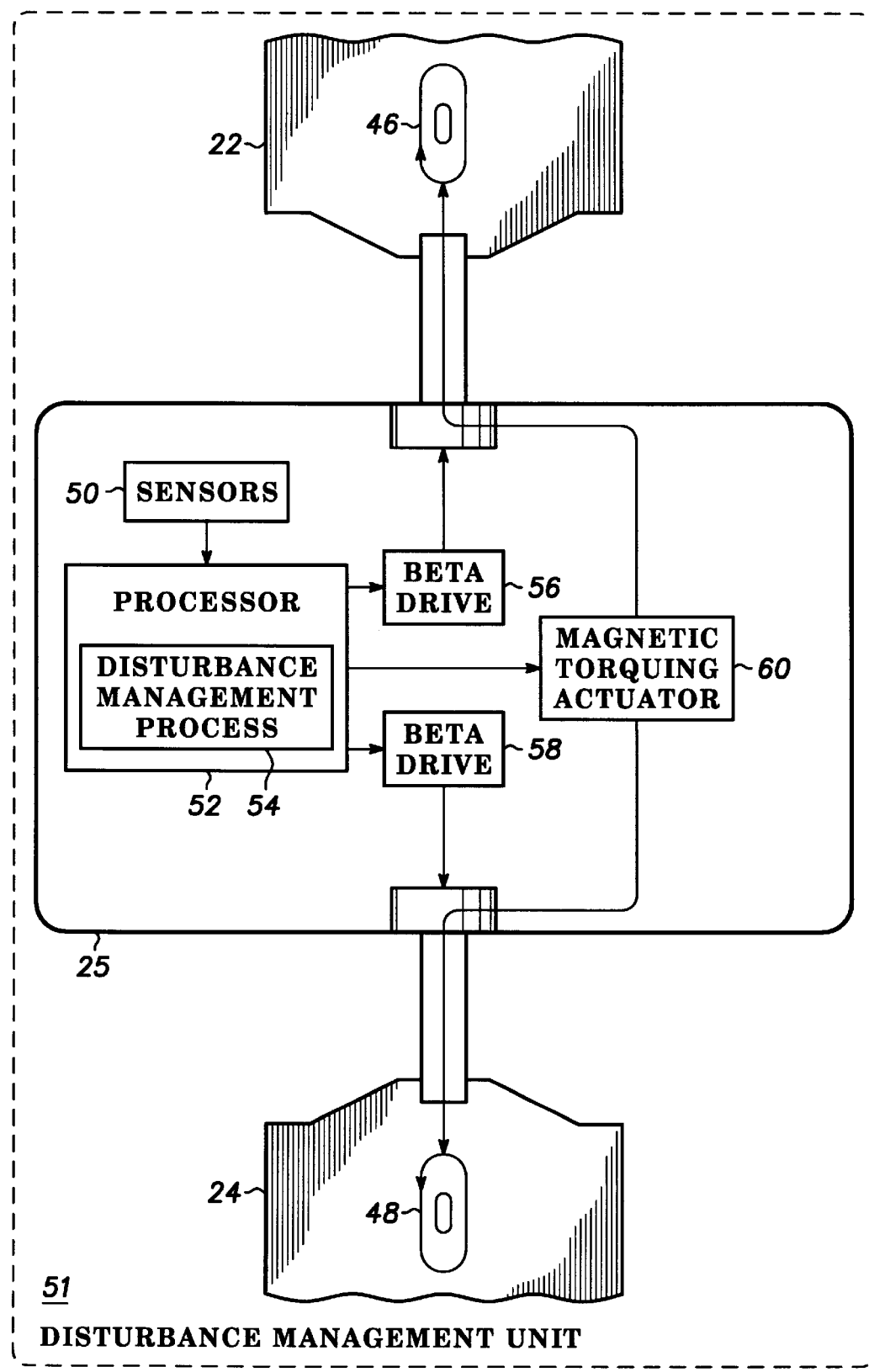
FIG. 2 shows a block diagram of a disturbance management unit in accordance with a preferred embodiment of the present invention.

FIG. 2 shows a block diagram of a disturbance management unit 51 in accordance with a preferred embodiment of the present invention. Disturbance management unit 51 maneuvers solar panels 22 and 24 and controls solar panel electrical current loops 46 and 48 to generate counter-disturbance torques. A sensor system 50 is used to detect an attitude of satellite 20 and an alignment of solar panels 22 and 24 relative to satellite body 25. Sensor system 50 may include one or more earth sensors, sun sensors, GPS sensors, an inertial reference system, or other attitude sensors known in the art. Sensor system 50 couples to a processor 52 which performs a disturbance management process 54. Processor 52 may be one of many on-board computers (not shown) or may represent a collection of on-board computers in data communication with one another. Moreover, processor 52 can perform many processes (not shown) in addition to disturbance management process 54.

As described below with reference to FIG. 3, disturbance management process 54 estimates the component of satellite motion that is attributable to disturbance torque and commands beta drives 56 and 58 and a magnetic torquing actuator 60 to counter the disturbance. Beta drives 56 and 58 are commanded to perform two-axis solar tacking. Windmill axis 26 and overturning axis 28 are the two axes about which solar tacking is performed. Magnetic torquing actuator 60 controls a magnetic field which interacts with the earth's magnetic field to induce a torque that has components about pitch axis 30. Thus, solar tacking torques about windmill and overturning axes 26 and 28, respectively, are assisted by a magnetic torque about pitch axis 30 to provide attitude control in all three axes. Processor 52 couples to beta drives 56 and 58 for north and south solar panels 22 and 24, respectively. Processor 52 also couples to magnetic torquing actuator 60.

Referring also to FIG. 1, beta drives 56 and 58 allow solar panels 22 and 24 two degrees of rotational freedom to maneuver about overturning axis 28 and pitch axis 30. North beta drive 56 couples to north solar panel 22. North beta drive 56 causes north solar panel 22 to tilt about overturning axis 28 and to pivot about pitch axis 30. South beta drive 58 couples to south solar panel 24. South beta drive 58 causes south solar panel 24 to tilt about overturning axis 28 and to pivot about pitch axis 30.

Referring back to FIG. 2, magnetic torquing actuator 60 balances the electrical currents flowing in current loops 46 and 48 on solar panels 22 and 24, respectively. When current is balanced between current loops 46 and 48, equal magnitude but opposingly directed magnetic fields are generated and no residual magnetic torque is created. A current imbalance in current loops 46 and 48 generates a combined magnetic torque due to interaction between the combined magnetic field and the earth's magnetic field. The polarity and magnitude of the imbalance may be controlled by processor 52 working through magnetic torquing actuator 60. Thus, magnetic torquing actuator 60 modulates the magnetic field to direct a magnetic torque portion of a counter-disturbance torque, discussed below, in a desired direction. Conventional magnetic torquing devices mounted on panels 22 and 24 and known to those skilled in the art can be used in the preferred embodiments. However, such devices are used in the preferred embodiments to augment the satellite attitude adjustment capability of beta drives 56 and 58 by providing a torquing component about pitch axis 30.

Figure 3:
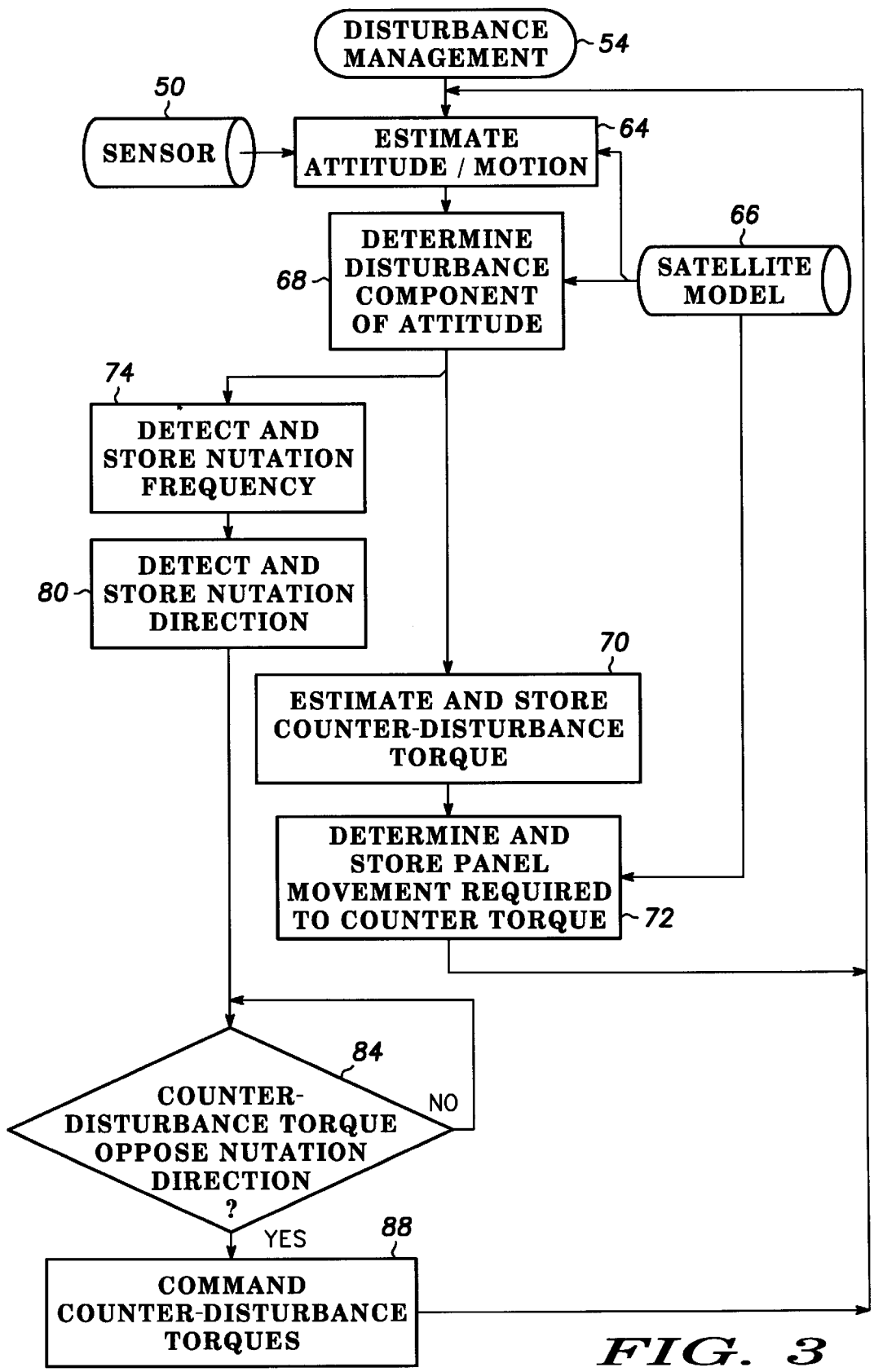
FIG. 3 shows a flow chart of a process for managing disturbance torques in accordance with a preferred embodiment of the present invention.

FIG. 3 shows a flow chart of disturbance management process 54 in accordance with a preferred embodiment of the present invention. The following discussion refers to items shown in FIGS. 1, 2, and 3. Generally, process 54 estimates the component of attitude or motion attributable to disturbance torque on three axes and then commands beta drives 56 and 58 and magnetic torque actuator 60 in stages to counter the three-dimensional disturbance. Process 54 operates in a continuous loop so that continuous counter-disturbance adjustments may be made as needed to damp disturbances. By continuously making counter-disturbance adjustments, satellite 20 desirably maintains a precise desired attitude.

A task 64 estimates satellite attitude and motion by evaluating outputs from sensor system 50. Task 64 may make its satellite attitude estimates by comparing sensor outputs with outputs from an on-board simulator or satellite model 66 which simulates satellite motions. Disturbance-caused components of satellite motion can result from solar wind and other factors acting on satellite 20. Non-disturbance-caused components of satellite motion may be due to normal orbit movement, directed responses to thrusters, and other station keeping maneuvers.

Next, a task 68 determines the disturbance torque about each axis that is responsible for the estimated disturbance-caused components of satellite motion determined above in task 64. Task 68 may evaluate satellite model 66 weight distribution data in making its determination. In other words, task 68 computes the torques that could have been experienced by satellite 20 about windmill axis 26, overturning axis 28, and pitch axis 30 to cause satellite 20 to move in a manner consistent with sensor system 50 readings. Factors used to calculate disturbance torque include satellite mass, weight distribution, volume, sun declination, and panel alignment. Task 68 integrates the calculations for windmill axis 26, overturning axis 28, and pitch axis 30. This integration allows determination of a correct counter-disturbance torque 90 for all axes, as described below, without causing a new disturbance torque about one axis when a counter-disturbance torque is applied solely to another axis.

Figure 4:
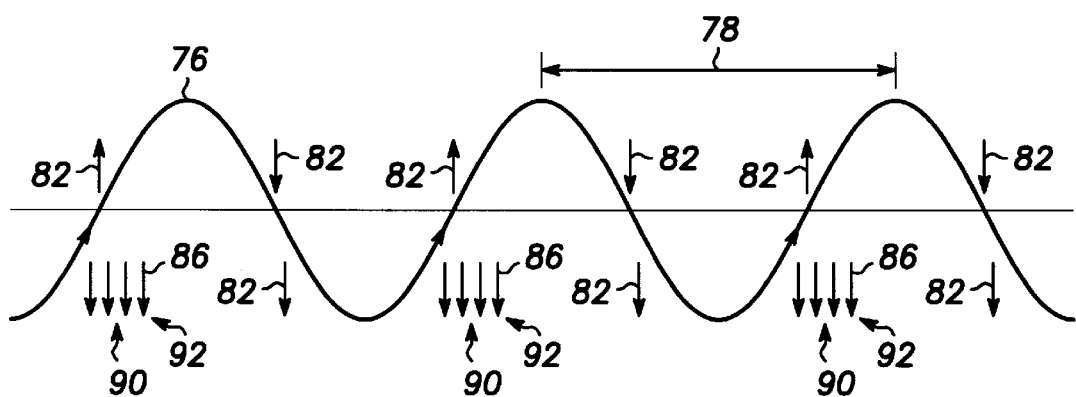
FIG. 4 shows a curve representing the application of counter-disturbance torques in a manner which damps nutation derived in accordance with a preferred embodiment of the present invention.

After task 68, a task 70 estimates and stores a counter-disturbance torque 90 (FIG. 4). During task 70 counter-disturbance disturbance torque 90 is calculated to oppose disturbance torques satellite 20 is experiencing as determined above in task 68.

Like disturbance torque, counter-disturbance torque 90 has components in windmill axis 26, overturning axis 28, and pitch axis 30, but counter-disturbance torque 90 is in an opposing direction to a disturbance torque. Arrows 34, 36, and 44 indicate possible disturbance torque components. A combined disturbance torque would be the vector sum of disturbance torques in all three axes. Counter-disturbance torque 90 is a torque having a direction and having components in up to all three axes. However, counter-disturbance torque 90 has a direction, discussed later in relation to FIG. 4, which opposes the direction of the combined disturbance torque.

After task 70, a task 72 determines and stores panel movements and differential panel current changes that will achieve the counter-disturbance torques 90 (FIG. 4) determined above in task 70.

Panel movements consist of tilting panels 22 and 24 about overturning axis 28 and pivoting panels 22 and 24 about pitch axis 30, providing two degrees of rotational freedom. Magnetic torquing actuator 60 modulates electrical current in panels 22 and 24 to generate a magnetically induced torque. When beta drives 56 and 58 cause solar panels 22 and 24 to tilt about overturning axis 28, this modulating current generates magnetic torque having a component about pitch axis 30. However, the generated magnetic torque will most likely also have torque components in overturning and windmill axes 28 and 26, respectively. Desirably, task 72 accounts for substantially all torque components in all three axes which are produced directly and indirectly from the determined panel pivot, panel tilt, and generated magnetic torque so that the resultant torque vector sum of all such direct and indirect torques is the desired counter-disturbance torque 90.

Upon completion of task 72, process flow loops back to task 64. The looping of process flow indicates that process 54 continuously performs tasks 64, 68, 70 and 72 in the preferred embodiments throughout the on-orbit life of satellite 20.

In parallel with task 70 and after task 68, a task 74 is performed. Task 74 detects a nutation frequency of satellite 20 and stores the nutation frequency for future use. Nutation represents an attitude error that repeats cyclically throughout the orbit of satellite 20. Nutation may be due to disturbances acting upon momentum wheels (not shown) located in satellite body 25.

FIG. 4 shows a curve representing the application of counter-disturbance torques in a manner which damps nutation derived in accordance with a preferred embodiment of the present invention. Curve 76 depicts an exemplary one-dimensional representation of satellite nutation over time. Those skilled in the art will appreciate that two or three dimensional nutation behaves in a similar manner to that depicted in FIG. 4. A nutation period 78 is typically less than a few hundred seconds in most satellites. Referring again to FIG. 3, task 74 detects the nutation frequency in response to the motion determination of task 68.

After task 74 of process 54, a task 80 detects the current nutation direction 82 (FIG. 4). For the one-dimensional example depicted in FIG. 4, a nutation direction 82 may be either "upward" or "downward," depending upon the nutation phase at a given instant. In three-dimensional space, nutation is primarily a rotation or wobble around pitch axis 30. Nutation phase can be calculated as the tangent of a windmill attitude angle divided by an overturning attitude angle.

Referring to FIG. 4, counter-disturbance torque 90 is also indicated in a direction 86 opposing nutation direction 82. In FIG. 3, a query task 84 uses stored information to determine whether direction 86 of counter-disturbance torque 90 opposes nutation direction 82. If query task 84 determines that counter-disturbance direction 86 does not oppose nutation direction 82, process flow remains at query task 84.

However, when query task 84 determines that counter-disturbance direction 86 opposes nutation direction 82, a task 88 commands the application of counter-disturbance torques 90. Accordingly, task 84 delays the application of counter-disturbance torque 90 until direction 86 of counter-disturbance torque 90 opposes nutation direction 82. By having directions 86 and 82 oppose one another, nutation is damped rather than amplified. Those skilled in the art will recognize that, although FIG. 4 indicates a "downward" counter-disturbance torque 90 direction 86 for a one dimensional example, a three-dimensional counter-disturbance torque 90 may be vectored in any direction.

Task 88 commands magnetic actuator 60 (FIG. 2) to modulate current loops 46 and 48. Modulating current loops 46 and 48 generates a counter-disturbance torque in a desired direction with torque components about windmill axis 26, overturning axis 28, and pitch axis 30. In the preferred embodiments, task 88 simultaneously commands beta drives 56 and 58 to pivot solar panels 22 and 24. Pivoting solar panels 22 and 24 create a counter-disturbance torque in a desired direction about pitch axis 30. Moreover, task 88 simultaneously commands beta drives 56 and 58 to tilt solar panels 22 and 24. Tilting solar panels 22 and 24 creates a counter-disturbance torque in a desired direction about overturning axis 28. Desirably, the combined effect of counter-disturbance torques applied about windmill axis 26, overturning axis 28, and pitch axis 30 dampens disturbances about overturning axis 28, pitch axis 30, and windmill axis 26. Satellite model 66 is updated to reflect the application of counter-disturbance torque 90.

In the preferred embodiment, only a portion of the entire counter-disturbance action may be activated during any single iteration of task 88. A single iteration of task 88 is referred to as a stage herein. Upon completion of task 88 for a given stage, control flow loops back to task 64. During subsequent stages, additional portions of the entire counter-disturbance action are activated. In other words, a given counter-disturbance action is desirably distributed in stages throughout several nutation cycles in synchronism with the nutation so that directions consistently oppose, as discussed above. In particular, the generation of a magnetic torque is timed to occur in stages that are synchronized with nutation as is the pivoting of panels 22 and 24. These two actions in particular tend to influence rotations, such as nutation, of satellite 20 about its pitch axis 30.

FIG. 4 illustrates the application of counter-disturbance actions 92 in a pulsing manner which is suitable for operating stepper motors within beta drives 56 and 58 (FIGS. 1 and 2). Each pulse of counter-disturbance actions 92 may pivot and/or tilt north and/or south solar panels 22 and 24 as needed to generate counter-disturbance torque 90. Activation of magnetic torquing actuator 60 need not be driven by pulses. During a single stage, a burst of pulses may be applied. A stream of counter-disturbance actions 92 is initiated in synchronism but out of phase with the nutation in order to dampen nutation while simultaneously compensating for disturbance torques experienced by satellite 20.

With further reference to satellite model 66 (FIG. 3), estimated attitude/motion, disturbance torque components, counter-disturbance torque 90, and nutation direction 82 and frequency 76 are fed to a simulator (not shown) within satellite model 66. In the preferred embodiment of this invention, the simulator is a Kalman filter. The simulator receives input to identify movement commanded by task 88 and to characterize sensor readings. The simulator then simulates satellite motion which should result from a commanded movement and compares the simulated motion with actual detected motion. This comparison data is incorporated into satellite model 66 in a manner known to those skilled in the art and used to alter modeling characteristics to influence future movements of solar panels 22 and 24. As the simulator progressively improves modeling of performance and movement of satellite 20, more precise movements are commanded resulting in improved satellite attitude management and enhanced satellite mission performance. As satellite 20 nears the end of its life, modeled information tracks satellite deterioration.

Many diverse counter-disturbance implementing schemes may be devised in accordance with the teaching of the present invention. For example, tilting solar panel 22 about overturning axis 28 generates an overturning torque and a pitch torque. To prevent or compensate for the overturning torque, either one of north solar panel 22 or south solar panel 24 can be moved in the desired direction during one nutation cycle while the other one of north solar panel 22 or south solar panel 24 can be moved in the desired direction during the next nutation cycle. Undesirable pitch torque can be compensated by tilting solar panels 22 and 24 and by generating magnetic torque.

In summary, minor movements of satellite solar panels occurring in synchronized actions in two rotational degrees of freedom, combined with solar panel electrical current fluctuation, are used to create a counter-disturbance torque in the windmill axis, overturning axis, and pitch axis. Desirably, the solar panel movements are made continuously over the course of an orbit resulting in more precise satellite attitude maintenance and improved efficiency in the use of satellite power.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method of managing effects of disturbance forces on a space vehicle having first and second solar panels in which electrical currents flow, said panels being deployed from a body in opposing directions substantially along a pitch axis, and said panels having overturning and windmill axes perpendicular to each other and to said pitch axis, said method comprising the steps of:
   a) estimating torques which will counter space vehicle motion attributable to said disturbance forces;
   b) tilting said solar panels about said overturning axis in response to said estimating step a); and
   c) generating, in response to said estimating step a) a magnetically induced torque about said pitch axis by modulating said electrical currents.

2. A method as claimed in claim 1 additionally comprising the steps of:
   detecting a nutation frequency of said space vehicle; and
   timing said generating step c) to occur in synchronism with said nutation frequency.

3. A method as claimed in claim 2 wherein:
   said generating step c) occurs in stages; and
   said timing step initiates said stages in synchronism with said nutation frequency.

4. A method as claimed in claim 2 wherein:
   said detecting step additionally detects a nutation direction;
   said generating step c) urges said solar panels to rotate in a rotation direction determined in response to said estimating step a); and
   said timing step comprises the step of delaying said generating step c) until said rotation direction opposes said nutation direction.

5. A method as claimed in claim 1 wherein said generating step c) occurs when said solar panels are positioned at an oblique angle to said body relative to said overturning axis.

6. A method as claimed in claim 1 wherein said tilting step b) and generating step c) occur substantially simultaneously.

7. A method of managing effects of disturbance forces on a space vehicle having first and second solar panels deployed from a body in opposing directions substantially along a pitch axis and having overturning and windmill axes perpendicular to each other and to said pitch axis, said method comprising the steps of:
   a) estimating space vehicle motion attributable to disturbance forces;
   b) estimating torques which will counter said space vehicle motion attributable to disturbance forces;
   c) tilting said solar panels about said overturning axis in response to said estimating step b); and
   d) pivoting said solar panels about said pitch axis in response to said estimating step b).

8. A method as claimed in claim 7 wherein said tilting step c) and said pivoting step d) occur substantially simultaneously.

9. A method as claimed in claim 7 wherein:
   electrical currents flow in said first and second solar panels; and
   said method additionally comprises the step of generating, in response to said estimating step b) a magnetically induced torque about said pitch axis by modulating said electrical currents.

10. A method as claimed in claim 9 additionally comprising the steps of:
    detecting a nutation frequency of said space vehicle; and
    timing said generating step to occur in synchronism with said nutation frequency.

11. A method as claimed in claim 10 wherein:
    said generating step occurs in stages; and
    said timing step initiates said stages in synchronism with said nutation frequency.

12. A method as claimed in claim 9 wherein said generating step occurs when said solar panels are positioned at an oblique angle to said body relative to said overturning axis.

13. A method as claimed in claim 9 wherein said tilting, pivoting, and generating steps occur substantially simultaneously.

14. A method as claimed in claim 7 additionally comprising the steps of:
    detecting a nutation frequency of said space vehicle; and
    timing said pivoting step d) to occur in synchronism with said nutation frequency.

15. A method as claimed in claim 14 wherein:
    said pivoting step d) occurs in stages; and
    said timing step initiates said stages in synchronism with said nutation frequency.

16. A method as claimed in claim 14 wherein:
    said detecting step additionally detects a nutation direction;
    said pivoting step d) pivots said solar panels in a pivot direction determined in response to said estimating step b); and
    said timing step comprises the step of delaying said pivoting step d) until said pivot direction opposes said nutation direction.

17. A satellite which implements magnetically assisted solar tacking, said satellite comprising:
    a satellite body having pitch, overturning, and windmill axes associated therewith, said pitch, overturning, and windmill axes being normal to each other;

first and second solar panels deployed from said body in opposing directions along said pitch axis, said first and second solar panels being configured so that first and second electrical currents, respectively, flow therein and generate a combined magnetic field that is acted upon by the magnetic field of the earth;

first and second solar panel drives coupled to said satellite body and said first and second solar panels, respectively, said first and second solar panel drives being configured to tilt said first and second panels about said overturning axis and to pivot said panels about said pitch axis;

a magnetic torque actuator coupled to said first and second solar panels, said magnetic torque actuator being configured to control said first and second electrical currents;

a sensor system configured to sense satellite motion; and a processor, coupled to said sensor system, said first and second solar panel drives, and said magnetic torque actuator, said processor being configured to estimate satellite motion attributable to disturbance forces, to estimate torques which will counter said satellite motion attributable to disturbance forces, and to determine a compensating combination of tilt angles for said first and second solar panels, pivot angles for said first and second solar panels, and first and second electrical currents for said first and second solar panels in response to said estimated torques.

18. A satellite as claimed in claim 17 wherein:

said processor is configured to initiate counter-disturbance torques; and said processor is further configured to detect a nutation frequency of said satellite and to time implementation of said counter-disturbance torques to occur in synchronism with said nutation frequency.

19. A satellite as claimed in claim 18 wherein said processor is further configured to cause said counter-disturbance torques to occur in stages and to time initiation of said stages in synchronism with said nutation frequency.

20. A satellite as claimed in claim 19 wherein:

said processor is additionally configured to detect a nutation direction and to delay initiation of said stages until said counter-disturbance torques oppose said nutation direction.

* * * * *